(12) United States Patent
Wang et al.

(10) Patent No.: US 11,194,961 B2
(45) Date of Patent: Dec. 7, 2021

(54) SYSTEMS, METHODS, AND APPARATUSES FOR ADDING A DOCUMENT HISTORY GRAPH AND CORRESPONDING HASH VALUE TO A BLOCKCHAIN IN A CLOUD BASED COMPUTING ENVIRONMENT

(71) Applicant: salesforce.com, inc., San Francisco, CA (US)

(72) Inventors: Chi Wang, Redmond, WA (US); Edet Edet Nkposong, Mercer Island, WA (US)

(73) Assignee: salesforce.com, inc., San Francisco, CA (US)

( * ) Notice: Subject to any disclaimer, the term of this patent is extended or adjusted under 35 U.S.C. 154(b) by 285 days.

(21) Appl. No.: 16/237,642

(22) Filed: Dec. 31, 2018

(65) Prior Publication Data

US 2020/0210519 A1 Jul. 2, 2020

(51) Int. Cl.
*G06F 40/197* (2020.01)
*G06F 16/182* (2019.01)
*H04L 9/32* (2006.01)
*G06F 16/901* (2019.01)
*H04L 9/06* (2006.01)
(Continued)

(52) U.S. Cl.
CPC .......... *G06F 40/197* (2020.01); *G06F 16/137* (2019.01); *G06F 16/1834* (2019.01); *G06F 16/9024* (2019.01); *G06F 21/604* (2013.01); *G06F 21/606* (2013.01); *G06F 21/6209* (2013.01); *G06F 21/64* (2013.01); *H04L 9/0618* (2013.01); *H04L 9/3239* (2013.01); *H04L 9/3247* (2013.01); *H04L 9/3297* (2013.01); *H04L 63/123* (2013.01); *G06F 2221/2145* (2013.01); *H04L 2209/38* (2013.01); *H04L 2463/121* (2013.01)

(58) Field of Classification Search
CPC .. G06F 40/197; G06F 16/137; G06F 16/9024; G06F 16/1834; G06F 21/604; G06F 21/606; G06F 21/6209; G06F 21/64; H04L 9/0618; H04L 9/3239; H04L 9/3247; H04L 9/3297; H04L 63/123
See application file for complete search history.

(56) References Cited

U.S. PATENT DOCUMENTS 10,122,661 B2 * 11/2018 Golan ................. G06F 16/2379
10,339,299 B1 * 7/2019 Magnuson ............ H04L 9/3239
(Continued)

OTHER PUBLICATIONS

Wang, CHI, Document Sign with History Graph, Apr. 2018, 7 pages.

*Primary Examiner* — Oleg Korsak
(74) *Attorney, Agent, or Firm* — Elliott, Ostrander & Preston, P.C.

(57) ABSTRACT

In a hosted computing environment a web server receives a document history graph. The web server performs a hash function, providing the document history graph as input to the hash function, the hash function providing a hash value as output. A blockchain services interface in the hosted computing environment generates a blockchain block that includes the hash value in a block payload hash field and the document history graph in a block payload field in the blockchain block. A blockchain consensus manager proposes adding the blockchain block to a private blockchain and receives an indication of consensus A block validator adds the blockchain block to the private blockchain responsive to consensus.

20 Claims, 10 Drawing Sheets

(51) Int. Cl.
*G06F 16/13* (2019.01)
*G06F 21/60* (2013.01)
*G06F 21/62* (2013.01)
*G06F 21/64* (2013.01)
*H04L 29/06* (2006.01)

(56) References Cited

U.S. PATENT DOCUMENTS

| | | | |
|---|---|---|---|
| 10,579,368 B2* | 3/2020 | Wisnovsky | G06F 16/2365 |
| 10,585,657 B2* | 3/2020 | Padmanabhan | H04L 9/0891 |
| 2018/0005186 A1* | 1/2018 | Hunn | G06F 40/103 |
| 2018/0157825 A1* | 6/2018 | Eksten | H04L 9/3239 |
| 2018/0329693 A1* | 11/2018 | Eksten | G06F 16/21 |
| 2019/0065709 A1* | 2/2019 | Salomon | H04L 9/006 |
| 2019/0312869 A1* | 10/2019 | Han | G06F 16/9024 |
| 2020/0250295 A1* | 8/2020 | Padmanabhan | H04L 67/306 |
| 2020/0252205 A1* | 8/2020 | Padmanabhan | H04L 9/0643 |
| 2020/0252404 A1* | 8/2020 | Padmanabhan | H04L 63/061 |
| 2020/0252406 A1* | 8/2020 | Padmanabhan | H04L 9/0891 |
| 2020/0287880 A1* | 9/2020 | Getsin | H04L 9/3247 |
| 2020/0374106 A1* | 11/2020 | Padmanabhan | G06F 21/64 |
| 2020/0401625 A1* | 12/2020 | Wright | G06F 16/90335 |

* cited by examiner

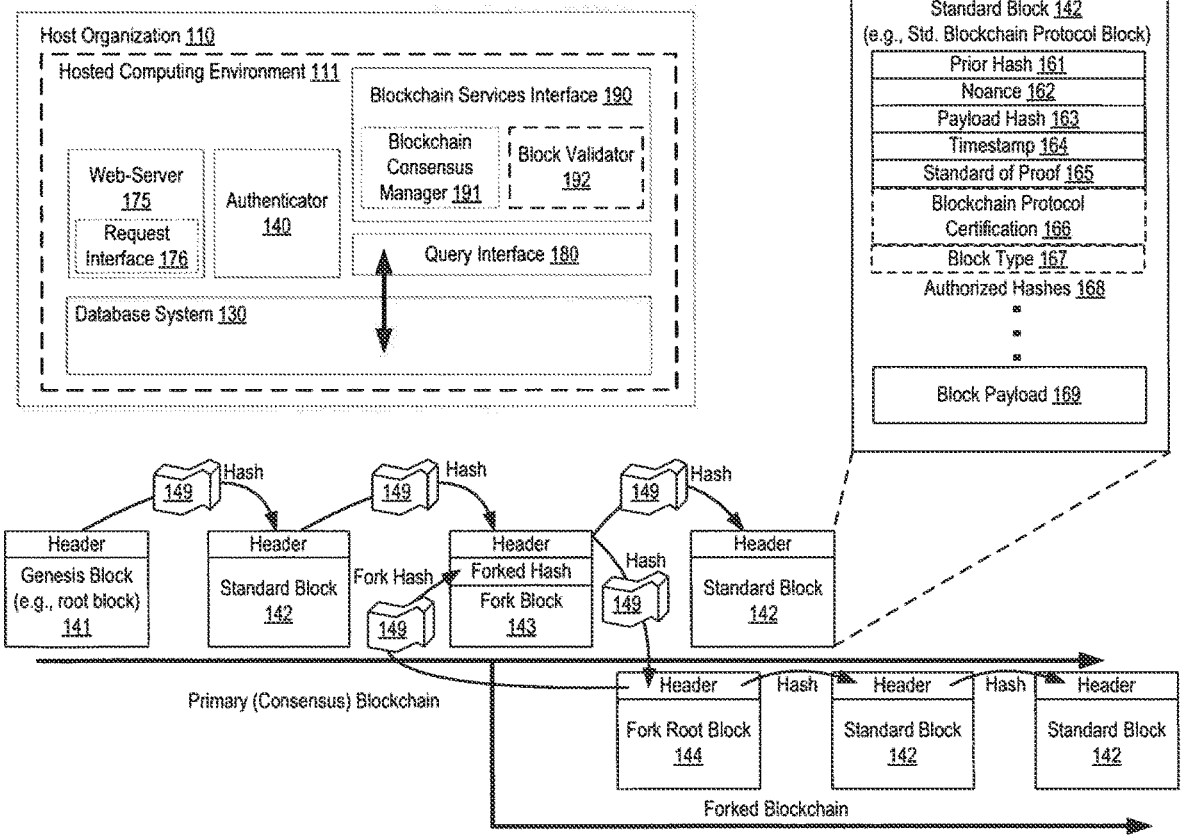

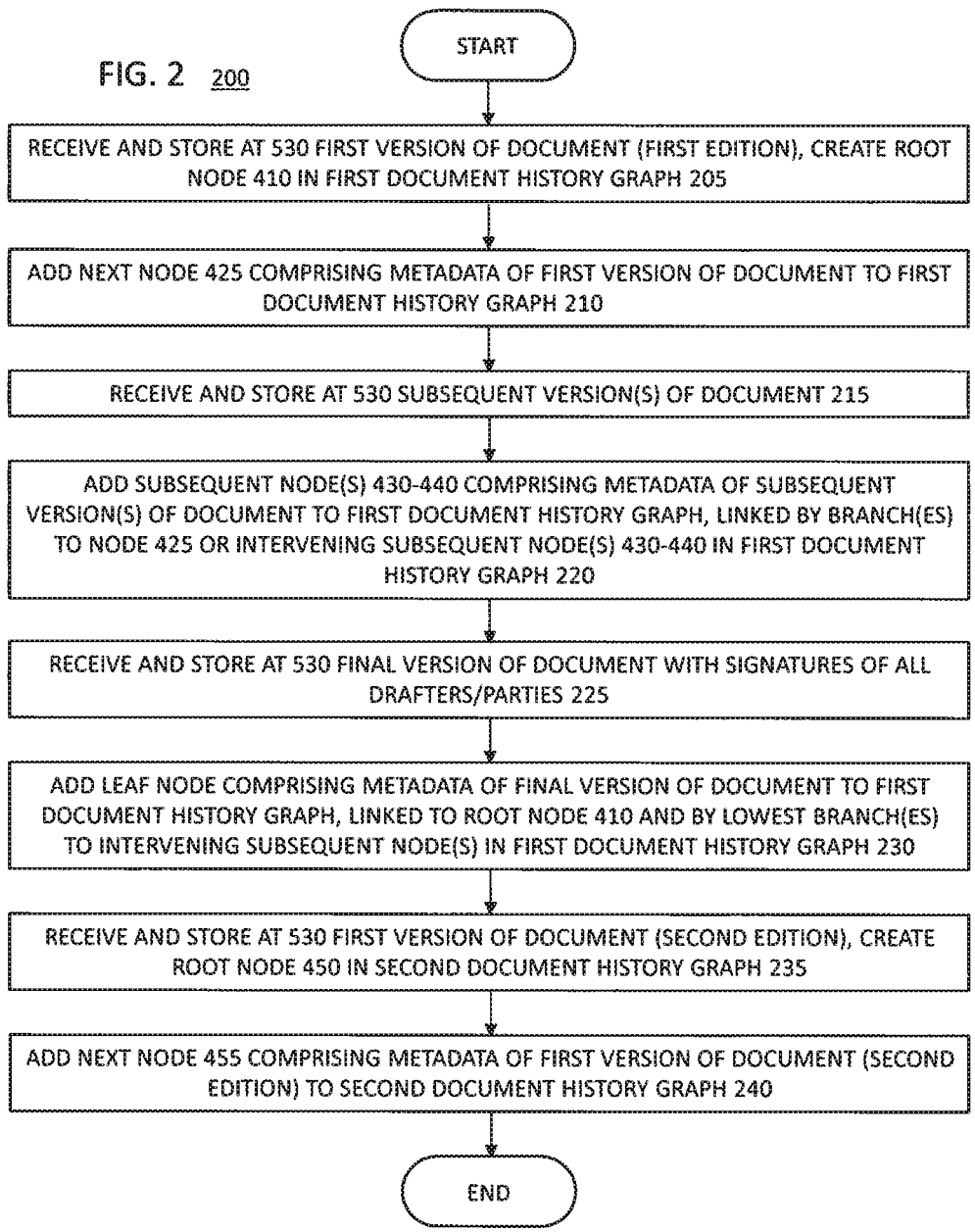

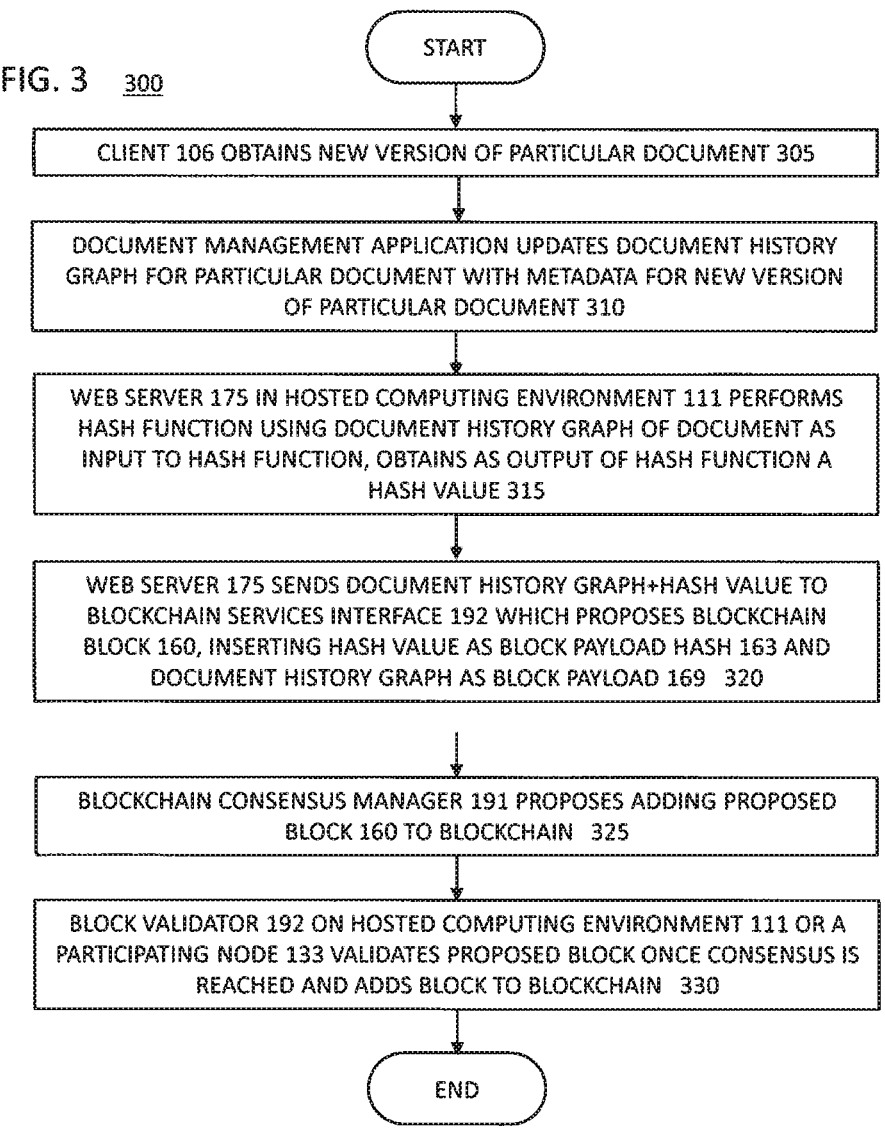

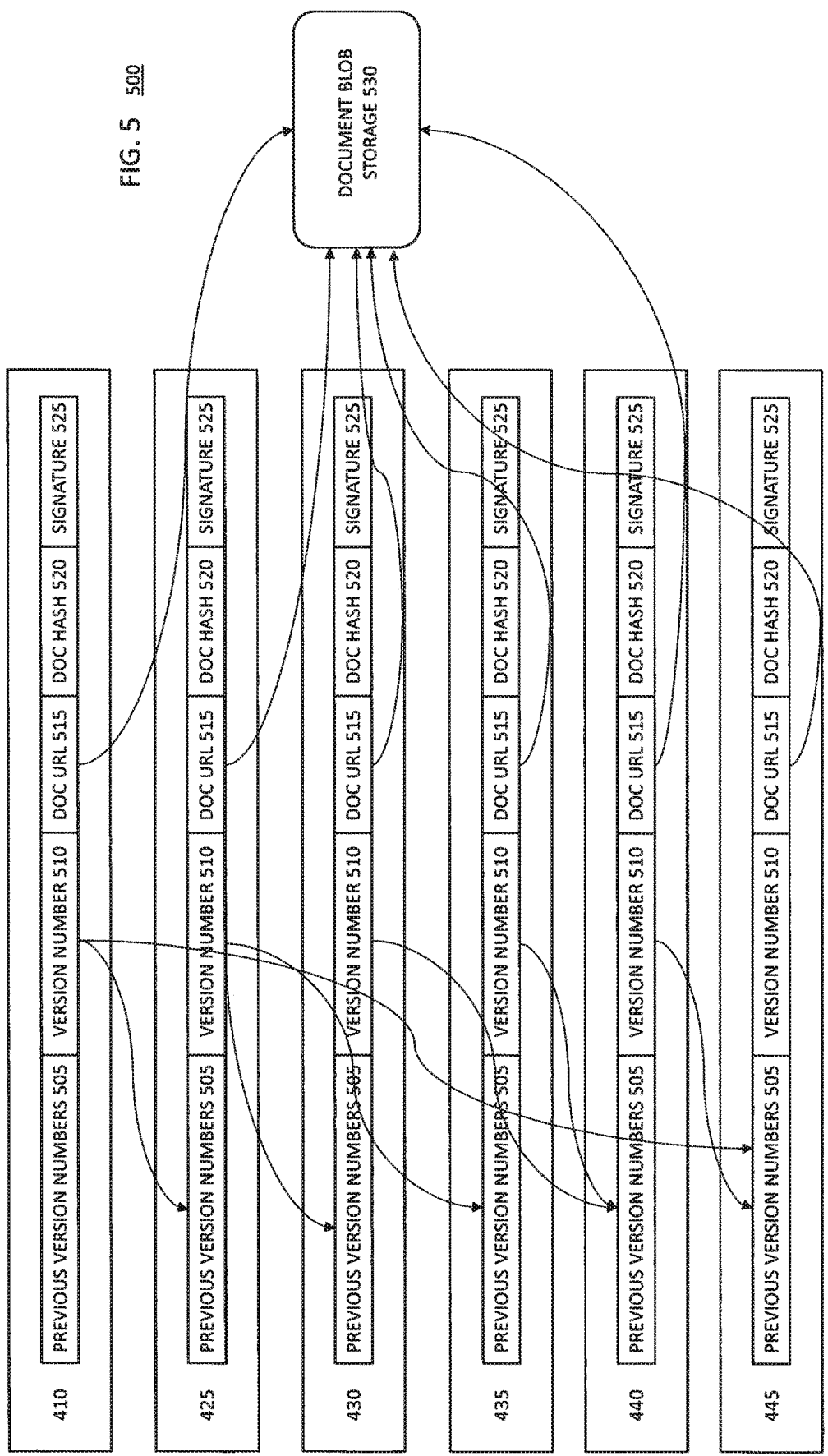

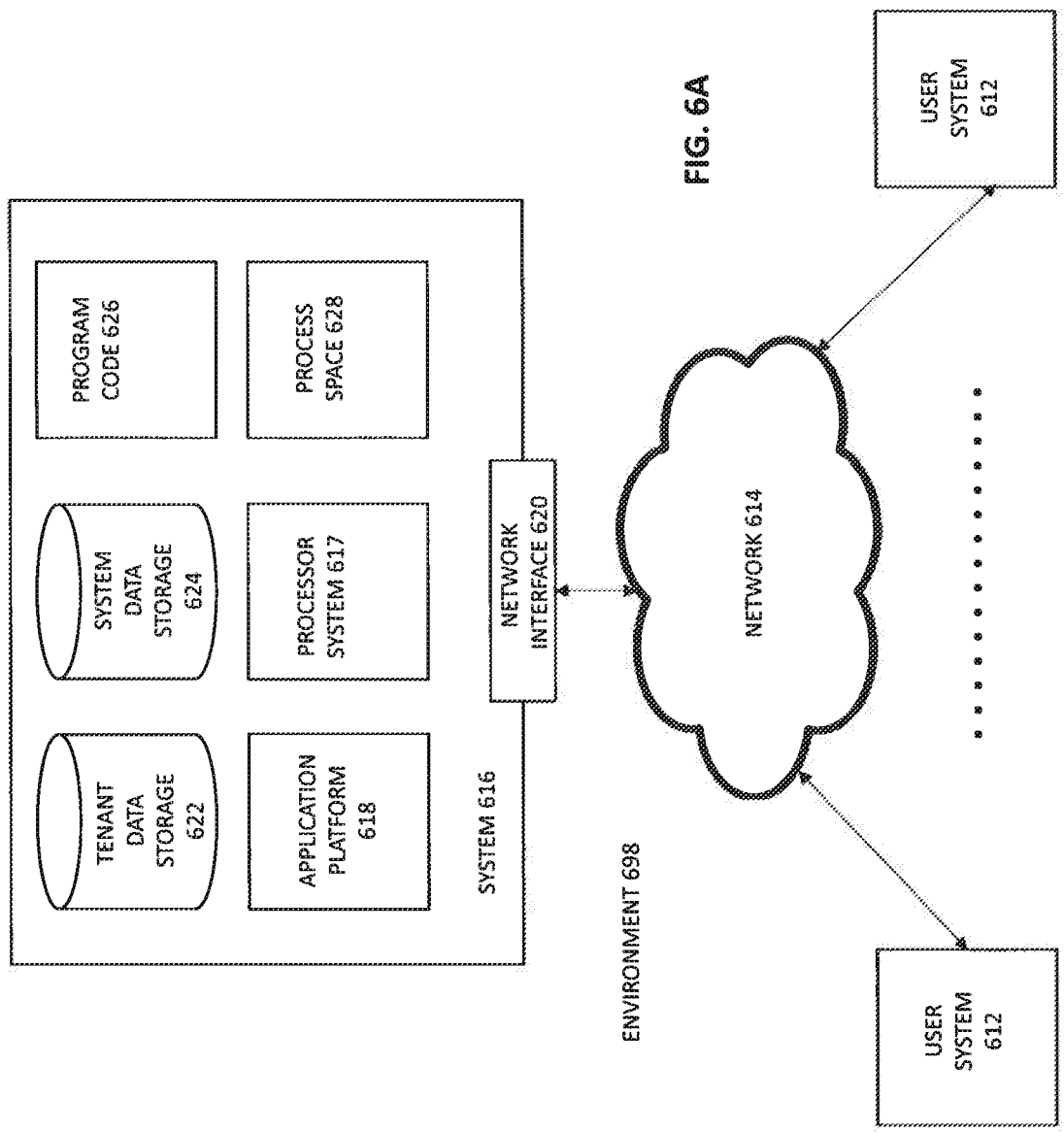

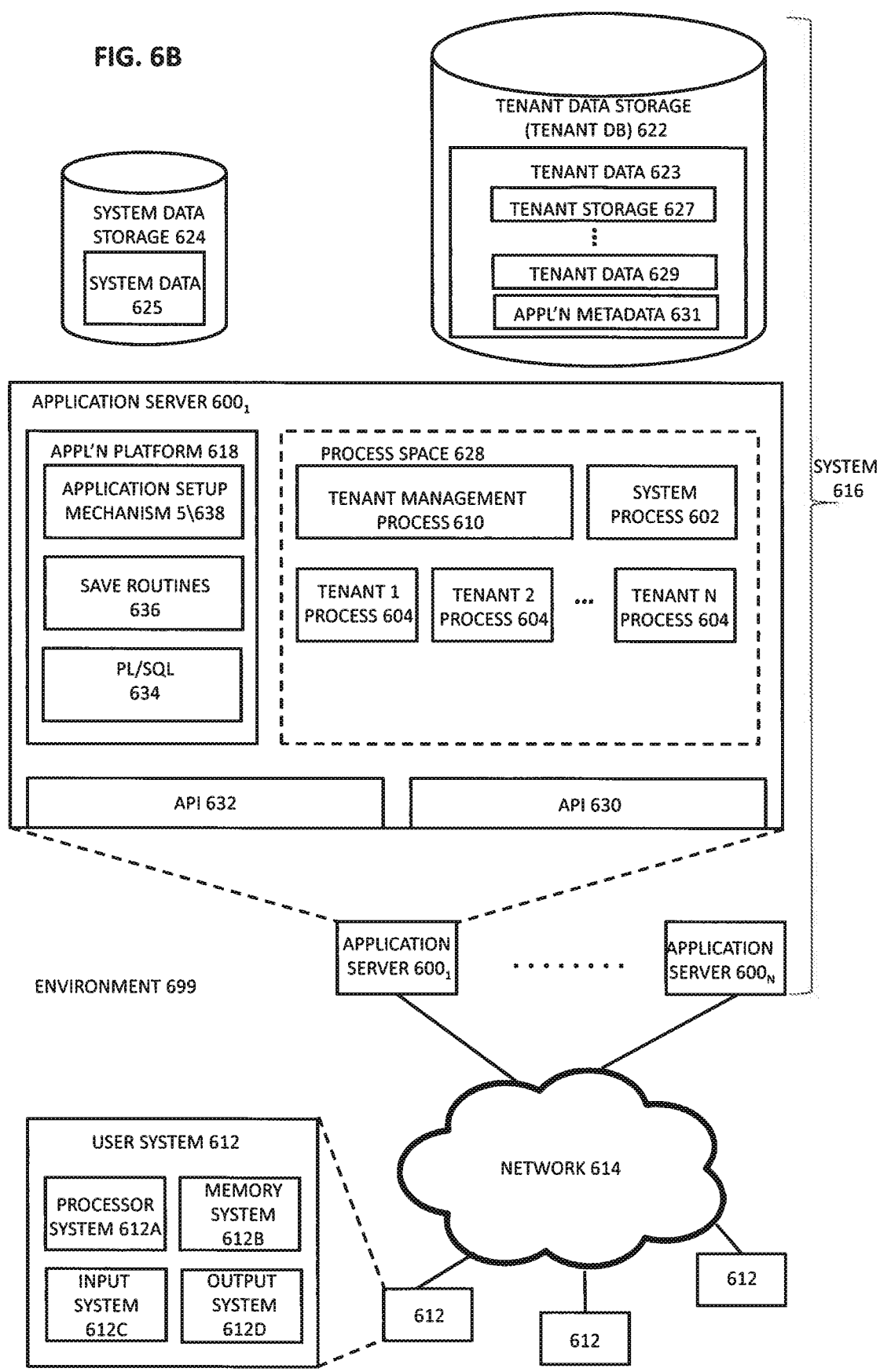

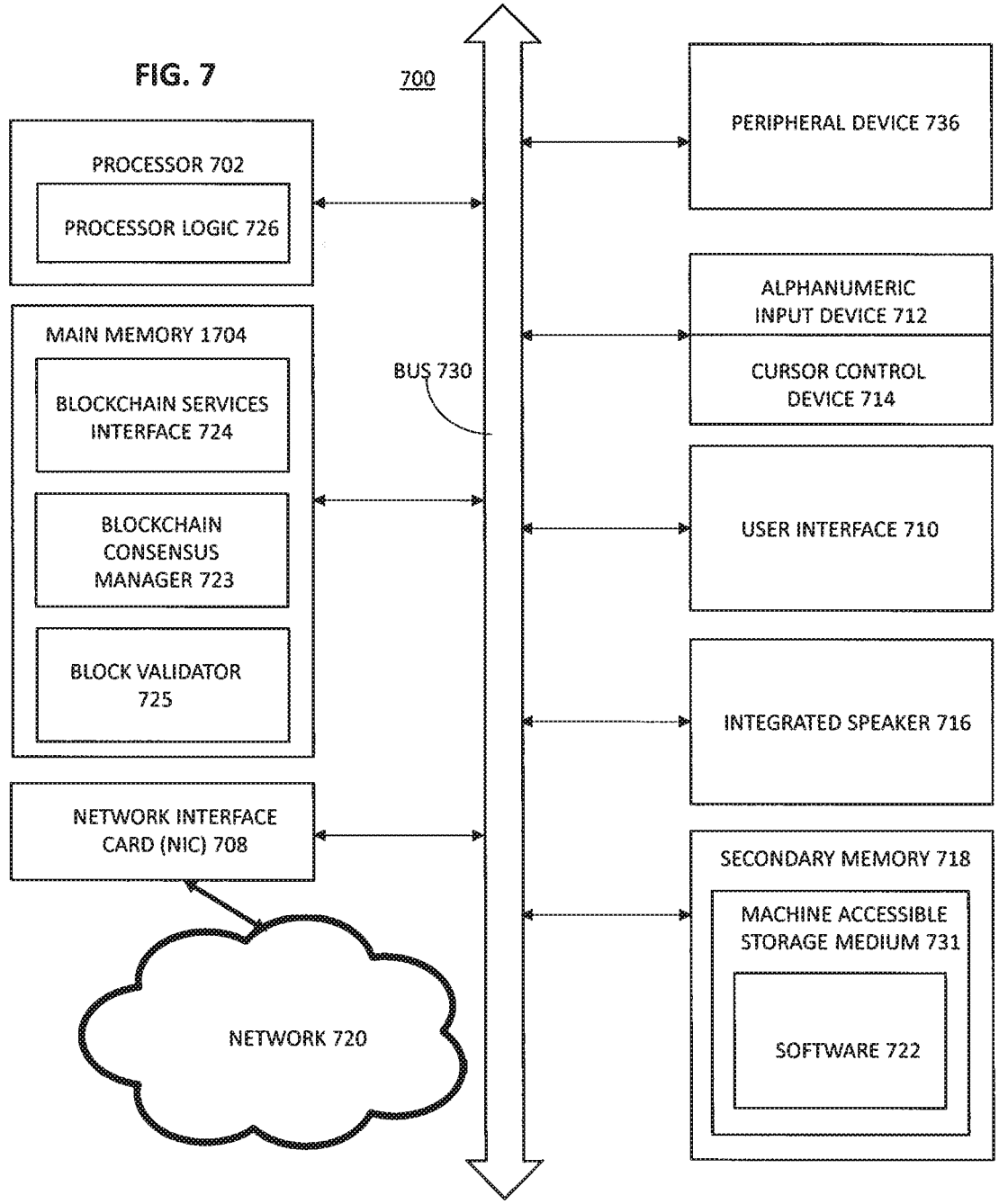

SYSTEMS, METHODS, AND APPARATUSES FOR ADDING A DOCUMENT HISTORY GRAPH AND CORRESPONDING HASH VALUE TO A BLOCKCHAIN IN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology. More particularly, disclosed embodiments relate to systems, methods, and apparatuses for adding a document history graph and corresponding hash value to a blockchain in a cloud based computing environment. Such embodiments may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A distributed, shared, ledger operated within this network can take advantage of blockchain technology without sacrificing the efficiency, security, privacy, and flexibility needed by financial or other institutions.

The present state of the art may therefore benefit from the systems, methods, and apparatuses for improving upon, modifying, and expanding upon distributed ledger technologies and providing such capabilities via an on-demand cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1C depicts another exemplary architecture, with additional detail of a blockchain and a forked blockchain, in accordance with described embodiments;

FIG. 2 depicts a flow diagram illustrating a method for implementing an embodiment of the invention;

FIG. 3 depicts a flow diagram illustrating a method for implementing an embodiment of the invention;

FIG. 5 is a block diagram of a document history graph according to an embodiment of the invention.

FIG. 6A illustrates a block diagram of an environment in which an on-demand database service may operate in accordance with the described embodiments;

FIG. 6B illustrates another block diagram of an embodiment of elements of FIG. 6A and various possible interconnections between such elements in accordance with the described embodiments; and FIG. 7 illustrates a diagrammatic representation of a machine in the exemplary form of a computer system, in accordance with one embodiment.

DETAILED DESCRIPTION

Figure 1A:
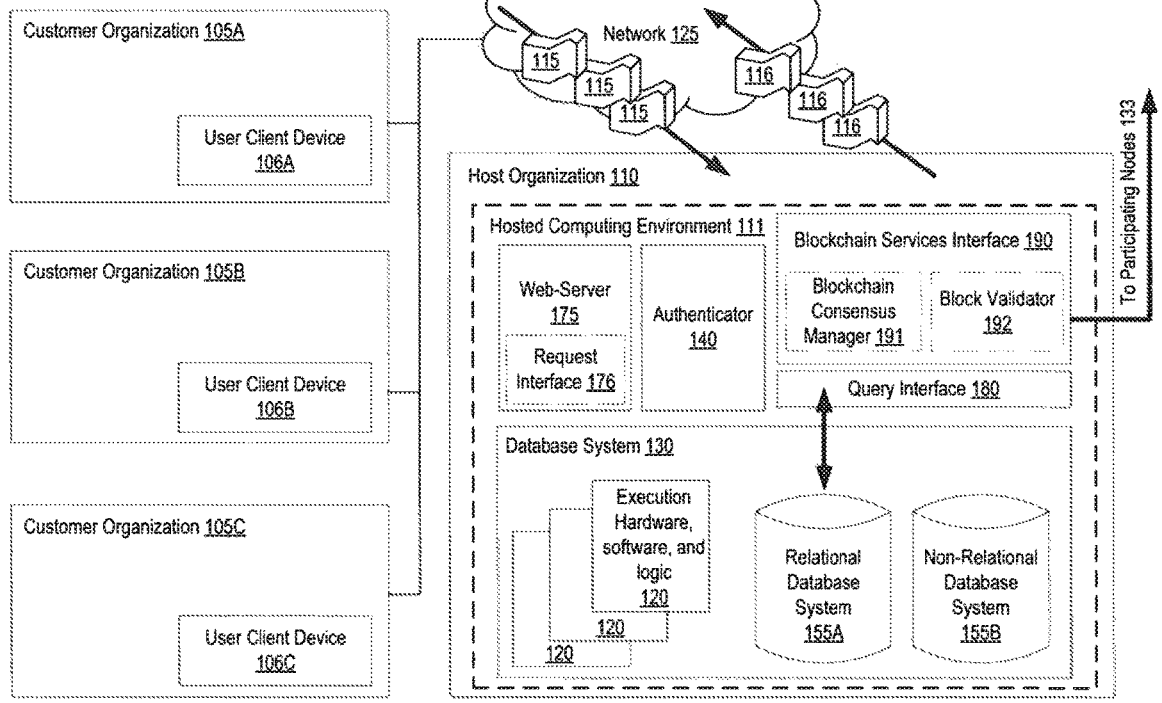
FIG. 1A depicts an exemplary architecture in accordance with described embodiments.

Described herein are systems, methods, and apparatuses for adding a document history graph and corresponding hash value to a blockchain in a cloud based computing environment.

For example, according to one embodiment, in a hosted computing environment having at least one processor and a memory therein, a web server in the hosted computing environment receives a document history graph. The web server performs a hash function, providing the document history graph as input to the hash function, the hash function providing a hash value as output. A blockchain services interface in the hosted computing environment generates a blockchain block that includes the hash value in a block payload hash field and the document history graph in a block payload field in the blockchain block. A blockchain consensus manager in the hosted computing environment proposes adding the blockchain block to a private blockchain. The blockchain consensus manager receives an indication of consensus among authorized blockchain nodes in the private blockchain to add the blockchain block to the private blockchain. Finally, a block validator in the hosted computing environment adds the blockchain block to the private blockchain responsive to receiving the indication of consensus.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Embodiments of the invention identify entities, such as documents, and different signed and unsigned versions of such documents, whether stored within or across multiple data stores, identify relationships between the entities, and generate a relationships graph that represents the entities and the identified relationships between entities, the relationships graph comprising nodes in the relationships graph to represent entities and edges between any two nodes in the relationships graph to represent the identified relationships between the entities represented by each of the two nodes, and store the relationships graph in a graph store, e.g., document blob storage. An important concept of the graph is the edge or relationship which directly relates data items in the store. The relationships allow data in the store to be linked together directly.

According to one embodiment, data in the graph is organized as nodes, relationships, and properties (data about the nodes or relationships), the key components of a graph database adhering to the property graph model. The components that make up the property graph model include the nodes that are the entities in the graph. They can hold any number of attributes (key-value pairs), also referred to as properties. Nodes can be tagged with labels, representing their different roles in a particular domain. Node labels may also serve to attach metadata to certain nodes. Relationships provide directed, possibly named and semantically-relevant, connections between two node entities. A relationship has a direction, a type, a start node, and an end node. Like nodes, relationships can also have properties. In most cases, relationships have quantitative properties, such as weights, costs, distances, ratings, versions, time intervals, or strengths. Although they are stored in a specific direction, relationships can be navigated efficiently in either direction.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A, a non-relational database system 155B, or unstructured data stores (not shown) according to certain embodiments.

Unstructured data (or unstructured information) is information that either does not have a pre-defined data model or is not organized in a pre-defined manner. Unstructured information is typically text-heavy, but may contain data such as dates, numbers, etc., as well. This may result in irregularities and ambiguities that make it difficult to understand using traditional programs as compared to data stored in fielded form in databases or annotated (semantically tagged) in documents.

Examples of unstructured data may include books, journals, documents, metadata, health records, audio, video, analog data, images, files, and unstructured text such as the body of e-mail messages, web pages, and word-processor documents. These types of unstructured data do not have a defined structure, and generally are packaged in objects (e.g., in files or documents) that themselves have structure and are, thus, a mix of structured and unstructured data, but collectively this is may still be referred to as unstructured data. For example, an HTML web page is tagged, but HTML mark-up typically used only for rendering the web page. It does not capture the meaning or function of tagged elements in ways that support automated processing of the information content of the page. XHTML tagging does allow machine processing of elements, although it typically does not capture or convey the semantic meaning of tagged terms.

Since unstructured data commonly occurs in electronic documents, the use of a content or document management system which can categorize entire documents may be preferred over data transfer and manipulation from within the documents. Document management thus provides a means to convey structure onto document collections.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity such as a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is a blockchain services interface 190 having included therein both a blockchain consensus manager 191 and a block validator 192. Blockchain services interface 190 communicatively interfaces the host organization 110 with other participating nodes 133 (e.g., via the network 155) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system can be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, contract management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions or information that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers can exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing it, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority should be considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications can be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
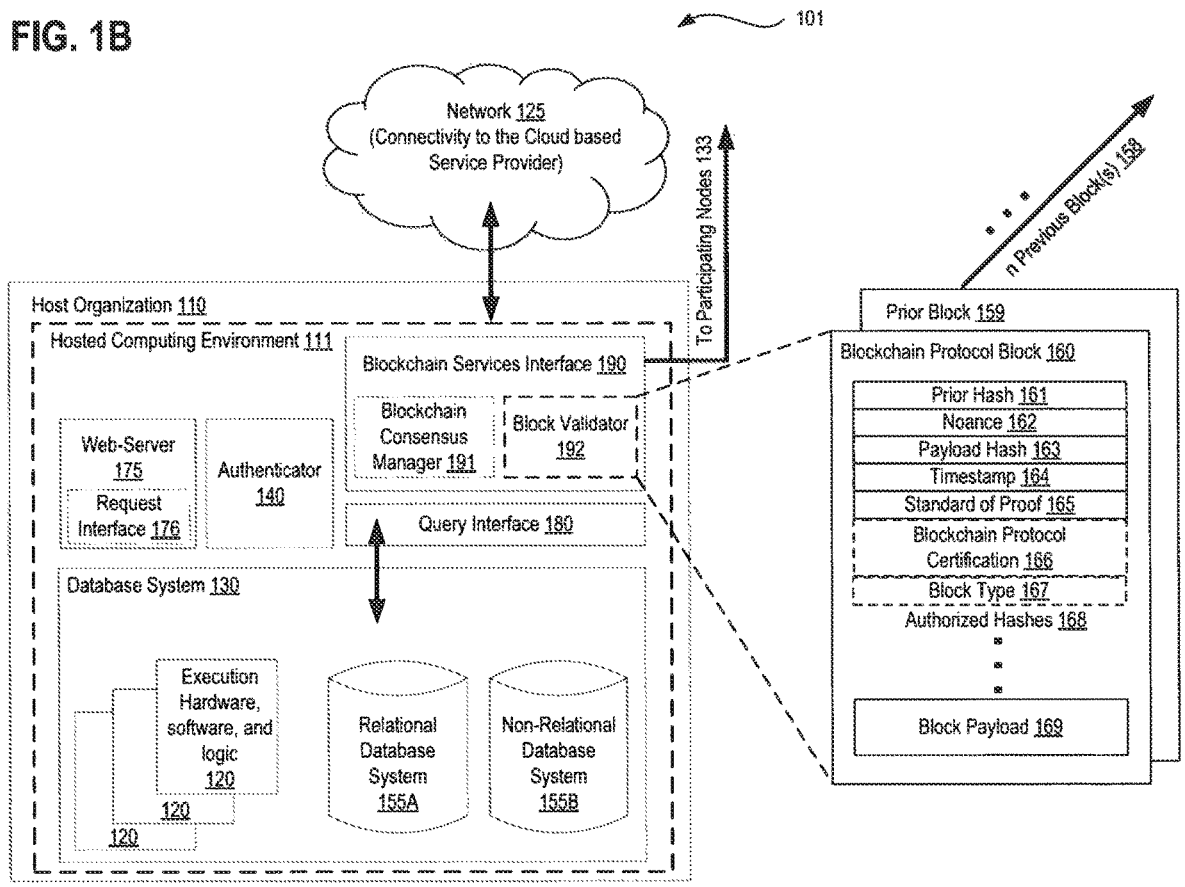
FIG. 1B depicts another exemplary architecture, with additional detail of a blockchain protocol block 160, in accordance with described embodiments.

FIG. 1B depicts another exemplary architecture 101, with additional detail of a blockchain protocol block 160, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

The prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment the non-reversible mathematical computation utilized is a SHA256 hash function, although other hash functions may be utilized. According to such an embodiment, the hash function results in any change to data in the prior block 159 or any of the n previous blocks 158 in the chain causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 is data stored within the block and may relate to any number of a wide array of transactional data depending on the particular implementation and blockchain protocol utilized, including payload information related to, for example, financial transactions, ownership information, data access records, document versioning, signed contracts, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, may be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

FIG. 1C depicts another exemplary architecture 102, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and what forked blockchains are created. The validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing potentially valid primary blockchains. Once consensus is reached (typically after one or two cycles and new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which tokens, value, or payload entries from one blockchain may be securely used within a completely separate blockchain via a pre-defined exchange or conversion scheme, and yet, be permissibly moved back to the original chain, if necessary. By convention the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest or heaviest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

FIGS. 2 and 3 depict flow diagrams illustrating aspects of methods for implementing a document history graph that leverages distributed ledger technology in embodiments of the invention. In the embodiments, a hosted blockchain platform is provided based on one or more blockchain framework implementations, including tools for building blockchain business networks and blockchain based applications. The hosted blockchain platform may provide Blockchain as a Service (BaaS) to customers of a cloud based computing environment service provider, such as the assignee of the present patent application, so that the customers do not have to configure and set up a working blockchain and consensus models, including the attendant hardware and software. The described methods may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, its database system 130 as depicted at FIG. 1A, et seq., and other systems and components as described herein may implement the described methodologies. Some of the logic blocks and/or operations listed below are optional in accordance with certain embodiments. The numbering of the logic blocks presented is for the sake of clarity and is not intended to prescribe an order of operations in which the various logic blocks must occur.

Some embodiments of the invention may operate in connection with a permissioned, or private, blockchain-based distributed ledger technology. In one embodiment, a consortium of nodes participate in the permissioned blockchain, wherein each node is operated on or by a different party in the consortium. For example, the consortium might include some number of banking or financing institutions, or insurance companies. In any case, the consortium members each communicate via their respective node with other members of the consortium to add and/or verify assets and/or transactions involving the assets to the permissioned blockchain.

Signing documents is a fundamental step in doing business. Business parties sign a contract or agreement to declare their commitment, responsibilities and rights, regarding business activities in which they are involved. Embodiments of the invention provide a mechanism by which to track and obtain consensus on drafts of documents exchanged between parties so that the parties agree to sign the documents. Embodiments provide not only for securely signing a document, but also provide a mechanism by which the parties may accurately communicate and exchange drafts of documents until an agreement on a final document is achieved, and signatures are obtained on a final document. Embodiments of the invention provide an enterprise solution based on blockchain technology to provide an integrated document signing tool which addresses document draft proposals, draft history tracking, document version tracking, security, trust, and document signing and signature validation. Further details of embodiments of the invention follow in the discussion below, with reference to FIGS. 2-5.

FIG. 2 depicts a flow diagram illustrating a method 200 for creating a document history graph according to an embodiment of the invention. At logic block 205, one or more users at one or more client devices 106 creates a new version of a particular document, for example, an initial, or first, version of a contract document. A document management application executing on a web server 175 in a hosted computing environment 111 receives the initial version of the document and stores the initial version of the document in cloud storage, for example, document blob storage 530 located, for example, in database system 130. Assuming for the sake of this example that this is the first edition of the document, the initial version of the document is the first indication or notification that the document management application receives about the document. As a result, the document management application creates a root node 410 in a first document history graph among a plurality of such graphs 400 depicted in FIG. 4. The root node, also referred to as a genesis node, is a special node that begins the document history graph for the first edition of the document, and is different from the other nodes that follow in the document history graph because it is the first node in the document history graph and, therefore, cannot, by definition, include any details of any earlier version of the first edition of the document, since none exists.

The root node 410 is the beginning of a document history graph for a particular edition of a document. Other root nodes may be created at some point in time as the beginning of a different document history graph for a different edition of the same document, or as the beginning of a different document history graph for a different document, all of which relate to documents that are shared among a group of drafters/parties/clients. For example, group contract 405 is a list of drafters/parties/clients that are working on and apply their signature to one or more versions of one or more editions of one or more documents in one or more document history graphs 400.

Figure 4:
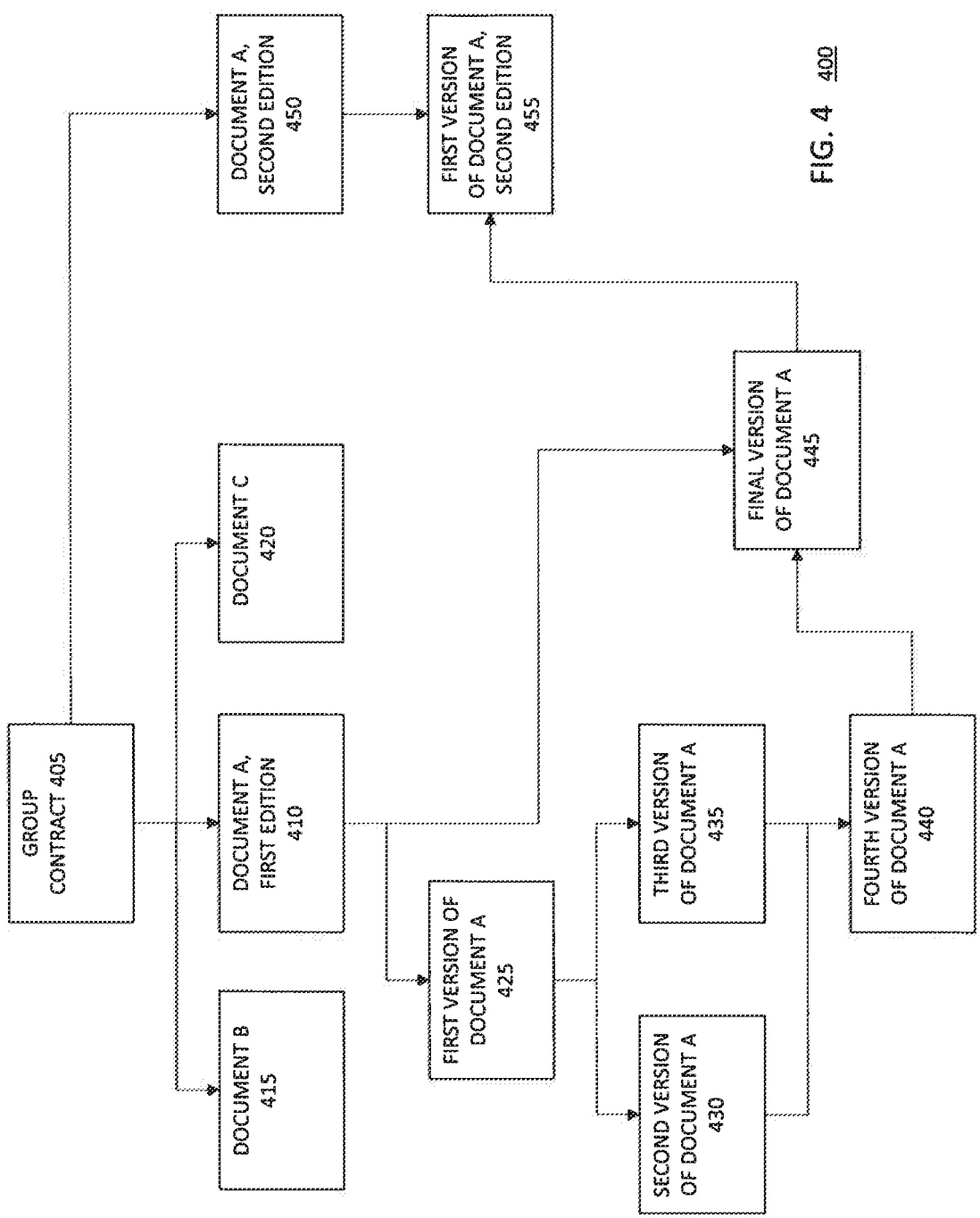
FIG. 4 is a block diagram of a document history graph according to an embodiment of the invention.

As depicted in FIG. 4, members of group contract 405 have access to a first document history graph for a first edition of a document "A" that begins with root node 410, a second document history graph for document "B" that begins with root node 415, a third document history graph for document "C" that begins with root node 420, and, finally, a fourth document history graph for a second edition of document "A" that begins with root node 450. Once the root node is created for a document history graph for the first edition of document "A", the document management application creates at logic block 210 a next, or second, node 425 in the first document history graph. The second node is a standard node, as are all remaining nodes to be added to this, or any other, document history graph, according to embodiments of the invention. The second node, as a standard node in the document history graph for the first edition of document "A" comprises metadata about the first version of the document.

With reference to FIG. 5, in one embodiment of the invention, node 425 includes the following metadata. First (although the ordering of metadata information in the node is not important), a previous version number 505 or previous transaction number 505 for a previous version of the document. In this particular instance, since node 425 is the second node in the document history graph for the first edition of document "A", and, as such, the first standard node in the graph, there is no previous version of the document, so the previous version number 505 is set to the value null. Node 425 further includes a version number 510 or transaction number 510 for the current version of this edition of the document. In this case, since this is the first version of this edition of the document, the version number indicates such, as "V1" or "T1" or machine readable equivalent. In one embodiment of the invention, version number 510 may be used as a public key to validate a signature of a party that signed the version of the document. This public key can be used to confirm the version or transaction is good or legitimate, or if someone tampered or otherwise changed it. The metadata further includes a pointer or address 515, e.g., a uniform resource locator (URL) to a location of the first version of the document in blob storage 530, and a hash value 520 (message digest) of the first version of the document using the initial version of the document as the input (message) to a hash function. Finally, the metadata may include a signature 525 of the party or parties that created the first version of the document. In one embodiment, the signature is created using the private key(s) of the drafter(s) of/party(s) to the first version of the document.

Subsequent versions of the first edition of the document may be created later in time, with each stored in blob storage 530 just as with the first version, and each represented by the same metadata as described above, stored in a respective node in the first document history graph. For example, FIG. 4 illustrates nodes 430, 435, 440 and 445 that store metadata regarding subsequent versions (second, third, fourth, and final versions respectively) of the first edition of the document "A". Notably, the second and third versions are based on, or revisions of, the first version, whereas the fourth version is a revision that takes into consideration the contents of both the second and third versions. The final version is designated as such when all the parties to the first edition of the document apply their signature, signifying agreement among all the parties to the document.

The previous version numbers 505 link a node to an earlier version of the document. For example, node 445 includes previous version numbers representing previous versions of the document, the metadata for which is maintained in nodes 410 and 440. Likewise, the metadata for the fourth version of the document is maintained in node 440, and it includes previous version numbers for the second and third versions of the document, the metadata for which is maintained in nodes 430 and 435. In this way, a document history graph forms a tree of nodes representing multiple versions of a document, with branches between nodes depicting the path from one or more versions of a document to another one or more versions of the document.

Continuing with the flow diagram depicted in FIG. 2, one or more users at one or more client devices 106 creates a subsequent version of a particular document, for example, a second version of a contract document. The document management application executing on the web server 175 in the hosted computing environment 111 receives the second version of the document and stores it at logic block 215 in cloud storage, for example, document blob storage 530 located, for example, in database system 130. The document management application at logic block 220 then creates a node 430 in the document history graph for the second version of the first edition of document "A" depicted in FIG. 4, which is linked by the previous version number stored in the node to the first version of the document, represented by node 425.

Likewise, one or more users at one or more client devices 106 creates a subsequent version of a particular document, for example, a third version of a contract document. The document management application executing on the web server 175 in the hosted computing environment 111 receives the third version of the document and stores it at logic block 215 in cloud storage, for example, document blob storage 530 located, for example, in database system 130. The document management application at logic block 220 then creates a node 435 in the document history graph for the third version of the first edition of document "A" depicted in FIG. 4, which is linked by the previous version number stored in the node to the first version of the document, represented by node 425.

In the same manner, one or more users at one or more client devices 106 creates a fourth version of the first edition of document "A". The document management application executing on the web server 175 in the hosted computing environment 111 receives the fourth version of the document and stores it at logic block 215 in document blob storage 530. The document management application at logic block 220 then creates a node 440 in the document history graph for the fourth version of the first edition of document "A" depicted in FIG. 4, which is linked by the previous version numbers stored in the node to the second and third versions of the document, represented by node 430 and 435, respectively.

Finally, one or more users at one or more client devices 106 creates a fifth and final version of the first edition of document "A". The document management application executing on the web server 175 in the hosted computing environment 111 receives the fifth version of the document and stores it at logic block 225 document blob storage 530. The document management application at logic block 230 then creates a leaf node 445 in the document history graph for the fifth and final version of the first edition of document "A" depicted in FIG. 4, which is linked by the previous version number stored in the node to the fourth version of the document, represented by node 440. In one embodiment, the fifth version of the document is considered the final version of the document because all the parties in contract group 405 have applied a signature to this version of the document.

In one embodiment, a second edition of a document can be created and the history of versions of the second edition can be stored in a separate document history graph linked to the leaf node in the document history graph for the first edition that represents the final version of the first edition of the document. For example, with reference to FIG. 2, a method 200 for creating a second document history graph according to an embodiment of the invention, is depicted. One or more users at one or more client devices 106 creates a new version of a second edition of a document, for example, an initial, or first, version of a second edition of a contract document. At logic block 235, a document management application executing on a web server 175 in a hosted computing environment 111 receives the initial version of the second edition of the document and stores it in document blob storage 530. The document management application creates a root node 450 in a second document history graph depicted in FIG. 4.

The root node 450 is the beginning of the document history graph for the second edition of the document. Members of group contract 405 have access to the second document history graph for the second edition of document "A" that begins with root node 450. Once the root node 450 is created in a document history graph for the second edition of document "A", the document management application creates at logic block 240 a second node 455 in the second document history graph. The second node, as a standard node in the document history graph for the second edition of document "A" comprises all the same metadata as described above, for the first version of the second edition of the document.

With reference to FIG. 5, in one embodiment of the invention, node 455 includes a previous version number 505 or previous transaction number 505 for a previous version of the document. In this particular instance, since node 455 is the second node in the document history graph for the second edition of document "A", and, as such, the first standard node in the graph, there is a previous version of the document, namely, the final version of the first edition of the document, so the previous version number 505 is set to point to node 445.

Subsequent versions of the second edition of the document may be created later in time, with each stored in blob storage 530 just as with the first version, and each represented by the same metadata as described above, stored in a respective node in the second document history graph, in the same manner as described above in regard to storing metadata in nodes in the first document history graph for the first edition of the document.

According to further embodiments of the invention, the document history graphs described above can be added to a blockchain, as described below. Unlike a traditional blockchain or distributed ledger system, in which every node or application has equal rights and responsibilities, embodiments of the invention have two types of nodes/applications. First, a client application executes in a cloud computing network and can sign documents, query documents, query signatures, check document history, etc., using the aforementioned document management application. Second, a blockchain services interface application executing on a web server in a hosted computing environment is responsible for generating blocks that include one or more transactions or nodes in the document history graph to be added to a blockchain. In this manner, the client application itself and the document management application do not generate blocks for a blockchain—blockchain tasks are separated from client devices, client applications, even the document management application.

With reference to the flow diagram depicted in FIG. 3, according to an embodiment, at logic block 305 a user client device creates or otherwise obtains a new version of a particular document. The document management application executing on the hosted computing environment, at a web server 175 in the hosted computing environment 111, receives the document, stores it in blob storage, and creates a new or updates an existing document history graph 400 as described earlier. In particular, at logic block 310, the document management application updates the document history graph for the particular document, for example, by creating a new node in the document history graph that contains the metadata for the new version of the particular document.

At logic block 315, the web server performs a hash function, providing the document history graph as input (the message) to the hash function. The hash function in turn provides a hash value (the message digest) as output.

At logic block 320, web server sends the document history graph (message) and hash value (message digest) to a blockchain services interface 724. The blockchain services interface generates a blockchain block that includes the hash value in a block payload hash field and the document history graph in a block payload field of the blockchain block.

At logic block 325, a blockchain consensus manager 723 in the hosted computing environment proposes adding the blockchain block to a private blockchain. Upon receiving at the blockchain consensus manager an indication of consensus among authorized blockchain nodes in the private blockchain to add the blockchain block to the private blockchain, a block validator 725 in the hosted computing environment adds the blockchain block to the private blockchain. Importantly, according to the described embodiments, the user client device, or an application executing thereon, does not participate in generating a block for the blockchain or adding the generated block to the blockchain. Only the web server, and in particular, the blockchain services interface and consensus manager in the hosted computing environment, participate in generating and proposing adding a blockchain block to the private blockchain. Separating these tasks from the user client device improves the efficiency of the consensus protocol as there are far fewer web servers than user client devices participating in the process. Separating these tasks in this manner also reduces the risk of the potential for the well-known hashrate attack by a majority (51% or greater) of nodes participating in the blockchain consensus protocol.

In one embodiment, performing the hash function at logic block 315 comprises performing the hash function in response to the web server receiving from the document management application an indication of change to the document history graph, such as a new node being added to the document history graph. In another embodiment, performing the hash function at logic block 315 comprises periodically performing the hash function without regard to the web server receiving an indication of change to the document history graph, such as, for example, every 5 minutes or some other predetermined period of time since the hash function was last performed.

According to one embodiment, the logic block 320 generating the blockchain block at the blockchain services interface in the hosted computing environment is performed in response to the web server receiving from a document management application an indication of change in the document history graph, for example, a new transaction/node is detected in the document history graph. In another embodiment, generating the blockchain block at the blockchain services interface in the hosted computing environment is performed periodically without regard to the web server receiving from a document management application an indication of change in the document history graph, such as every 5 minutes, or based on an event of some kind.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 730 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server 600i might be coupled via the network 614 (e.g., the Internet), another application server 600N-1 might be coupled via a direct network link, and another application server 600N might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a blockchain services interface 724 by which to interface tenants and users of the host organization with available supported blockchains, public or private. Main memory 704 also includes a blockchain consensus manager 723 and a block validator 725. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display, etc.), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

None of the claims in this patent application are intended to invoke paragraph six of 35 U.S.C. § 112(f) unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a hosted computing environment, the hosted computing environment having at least one processor and a memory therein, the method comprising:
   receiving, at a web server in the hosted computing environment, a document history graph;

performing, at the web server, a hash function, providing the document history graph as input to the hash function, the hash function providing a hash value as output;

generating, at a blockchain services interface in the hosted computing environment, a blockchain block that includes the hash value in a block payload hash field and the document history graph in a block payload field of the blockchain block, wherein the blockchain block is generated independently of one or more of: (i) a user client device, and (ii) an application executing on a user client device;

proposing, via a blockchain consensus manager in the hosted computing environment, adding the blockchain block to a private blockchain;

receiving at the blockchain consensus manager an indication of consensus among authorized blockchain nodes in the private blockchain to add the blockchain block to the private blockchain; and adding, via a block validator in the hosted computing environment, the blockchain block to the private blockchain responsive to receiving the indication of consensus.

2. The method of claim 1, wherein performing the hash function comprises performing the hash function in response to the web server receiving from a document management application an indication of change to the document history graph.

3. The method of claim 1, wherein performing the hash function comprises periodically performing the hash function without regard to the web server receiving an indication of change to the document history graph.

4. The method of claim 1, wherein generating, at the blockchain services interface in the hosted computing environment, the blockchain block, comprises generating the blockchain block in response to the web server receiving from a document management application an indication of change in the document history graph.

5. The method of claim 1, wherein generating, at the blockchain services interface in the hosted computing environment, the blockchain block, comprises periodically generating the blockchain block without regard to the web server receiving from a document management application an indication of change in the document history graph.

6. The method of claim 1, wherein receiving, at the web server in the hosted computing environment, the document history graph, comprises:

receiving an initial version of a document and creating a node in the document history graph, the node comprising metadata for the initial version of the document;

receiving additional versions of the document and creating corresponding nodes in the document history graph each comprising metadata for the respective versions of the document; and receiving a final version of the document and creating a leaf node in the document history graph comprising metadata for the final version of the document.

7. The method of claim 1, wherein the metadata for each of the initial, respective, and final versions of the document comprises a previous version number associated with an earlier version of the document dating back to the root node, a version number for the version of the document, a pointer to a location in a data store at which the version of the document is stored, a hash value of the version of the document, and a signature of one or more signatories to the version of the document.

8. A system to execute within a hosted computing environment, wherein the system comprises a processor and a memory to execute instructions on the system, the instructions providing:

means for receiving, at a web server in the hosted computing environment, a document history graph;

means for performing, at the web server, a hash function, providing the document history graph as input to the hash function, the hash function providing a hash value as output;

means for generating, at a blockchain services interface in the hosted computing environment, a blockchain block that includes the hash value in a block payload hash field and the document history graph in a block payload field of the blockchain block, wherein the blockchain block is generated independently of one or more of: (i) a user client device, and (ii) an application executing on a user client device;

means for proposing, via a blockchain consensus manager in the hosted computing environment, adding the blockchain block to a private blockchain;

means for receiving at the blockchain consensus manager an indication of consensus among authorized blockchain nodes in the private blockchain to add the blockchain block to the private blockchain; and means for adding, via a block validator in the hosted computing environment, the blockchain block to the private blockchain responsive to receiving the indication of consensus.

9. The system of claim 8, wherein the means for performing the hash function comprises means for performing the hash function in response to the web server receiving from a document management application an indication of change to the document history graph.

10. The system of claim 8, wherein the means for performing the hash function comprises means for periodically performing the hash function without regard to the web server receiving an indication of change to the document history graph.

11. The system of claim 8, wherein the means for generating, at the blockchain services interface in the hosted computing environment, the blockchain block, comprises means for generating the blockchain block in response to the web server receiving from a document management application an indication of change in the document history graph.

12. The system of claim 8, wherein the means for generating, at the blockchain services interface in the hosted computing environment, the blockchain block, comprises means for periodically generating the blockchain block without regard to the web server receiving from a document management application an indication of change in the document history graph.

13. The system of claim 8, wherein the means for receiving, at the web server in the hosted computing environment, the document history graph, comprises:

means for receiving an initial version of a document and creating a node in the document history graph, the node comprising metadata for the initial version of the document;

means for receiving additional versions of the document and creating corresponding nodes in the document history graph each comprising metadata for the respective versions of the document; and means for receiving a final version of the document and creating a leaf node in the document history graph comprising metadata for the final version of the document.

14. Non-transitory computer readable storage media having instructions stored thereon that, when executed in a hosted computing environment by a processor and a memory therein, cause the hosted computing environment to perform the following operations:

receiving, at a web server in the hosted computing environment, a document history graph;

performing, at the web server, a hash function, providing the document history graph as input to the hash function, the hash function providing a hash value as output;

generating, at a blockchain services interface in the hosted computing environment, a blockchain block that includes the hash value in a block payload hash field and the document history graph in a block payload field of the blockchain block, wherein the blockchain block is generated independently of one or more of: (i) a user client device, and (ii) an application executing on a user client device;

proposing, via a blockchain consensus manager in the hosted computing environment, adding the blockchain block to a private blockchain;

receiving at the blockchain consensus manager an indication of consensus among authorized blockchain nodes in the private blockchain to add the blockchain block to the private blockchain; and adding, via a block validator in the hosted computing environment, the blockchain block to the private blockchain responsive to receiving the indication of consensus.

15. The non-transitory computer readable storage media of claim 14, wherein performing the hash function comprises performing the hash function in response to the web server receiving from a document management application an indication of change to the document history graph.

16. The non-transitory computer readable storage media of claim 14, wherein performing the hash function comprises periodically performing the hash function without regard to the web server receiving an indication of change to the document history graph.

17. The non-transitory computer readable storage media method of claim 14, wherein generating, at the blockchain services interface in the hosted computing environment, the blockchain block, comprises generating the blockchain block in response to the web server receiving from a document management application an indication of change in the document history graph.

18. The non-transitory computer readable storage media of claim 14, wherein generating, at the blockchain services interface in the hosted computing environment, the blockchain block, comprises periodically generating the blockchain block without regard to the web server receiving from a document management application an indication of change in the document history graph.

19. The non-transitory computer readable storage media of claim 14, wherein receiving, at the web server in the hosted computing environment, the document history graph, comprises:

receiving an initial version of a document and creating a node in the document history graph, the node comprising metadata for the initial version of the document;

receiving additional versions of the document and creating corresponding nodes in the document history graph each comprising metadata for the respective versions of the document; and receiving a final version of the document and creating a leaf node in the document history graph comprising metadata for the final version of the document.

20. The non-transitory computer readable storage media method of claim 14, wherein the metadata for each of the initial, respective, and final versions of the document comprises a previous version number associated with an earlier version of the document dating back to the root node, a version number for the version of the document, a pointer to a location in a data store at which the version of the document is stored, a hash value of the version of the document, and a signature of one or more signatories to the version of the document.

* * * * *